Oct. 20, 1953 R. O. GRAY ET AL 2,656,406

SUBSCRIBER TELEVISION SYSTEM

Filed July 2, 1948 2 Sheets-Sheet 1

RICHARD O. GRAY
ERWIN M. ROSCHKE
*INVENTORS*

BY Bruce L. Birchard

*THEIR AGENT*

Oct. 20, 1953 R. O. GRAY ET AL 2,656,406

SUBSCRIBER TELEVISION SYSTEM

Filed July 2, 1948 2 Sheets-Sheet 2

RICHARD O. GRAY
ERWIN M. ROSCHKE
*INVENTORS*

BY [signature]
THEIR AGENT

Patented Oct. 20, 1953 2,656,406

UNITED STATES PATENT OFFICE 2,656,406

SUBSCRIBER TELEVISION SYSTEM

Richard O. Gray and Erwin M. Roschke, Broadview, Ill., assignors to Zenith Radio Corporation, a corporation of Illinois Application July 2, 1948, Serial No. 36,778

17 Claims. (Cl. 178—5.1)

This invention relates to radio signalling systems, and more particularly to such systems of the subscriber type.

It is an object of this invention to provide such a system in which a coding signal is utilized for coding a transmitted signal, and in which the characteristics of the coding signal are changed from time to time.

It is a further object of this invention to provide such a system wherein key signals are transmitted to subscriber receiver systems to indicate the times of occurrence of such changes in characterisitcs in the above coding signal.

Yet another object of this invention is to provide such a system wherein such key signals are transmitted to subscriber receiver systems by means of some private link, such as a telephone line, power line and the like, between transmitter and receiver.

A still further object of this invention is to provide such a system, in which the above mentioned coding signal is transmitted concomitantly with the transmitted coded signals but with unaltered characteristics, to be utilized in subscriber receiving systems for decoding the coded signals.

A more particular object of this invention is to provide a television system in which a coding signal is utilized for coding a transmitted television signal, and wherein the coding signal is transmitted to subscriber receiver systems modulated preferably on the audio carrier portion of the television signal.

It is an additional object of this invention to provide a subscription television system wherein a characteristic of one encoding signal is varied to develop a second encoding signal and wherein either one of these encoding signals may be used for encoding purposes.

It is still another object of this invention to provide a subscription television receiver for utilizing a television signal coded in accordance with a certain coding schedule in which one decoding signal is operated on by a second decoding signal to develop a third decoding signal which represents the coding schedule of the television signal.

Yet another particular object of this invention is to provide means in such a television system for changing the characteristics of the coding signal from time to time, and for transmitting key signals to indicate the times of occurrence of such changes, these key signals being transmitted to subscriber receiver systems by way of power lines, phone lines, or the like.

A further object of this invention is to provide in such coded electrical signalling systems, a receiver system to receive and decode signals transmitted in the above mentioned manner, upon receipt of the coding signal and the key signals.

It is still a further object of this invention to provide a subscription television receiver wherein mode changes are effected at a rate faster than the recurrence rate of the scanning fields.

The features of this invention, which are believed to be new, are set forth with particularity in the appended claims. The invention itself, however, together with further objects and advantages thereof may best be understood by reference to the following description when taken in conjunction with the accompanying drawings, in which:

Figure 1:
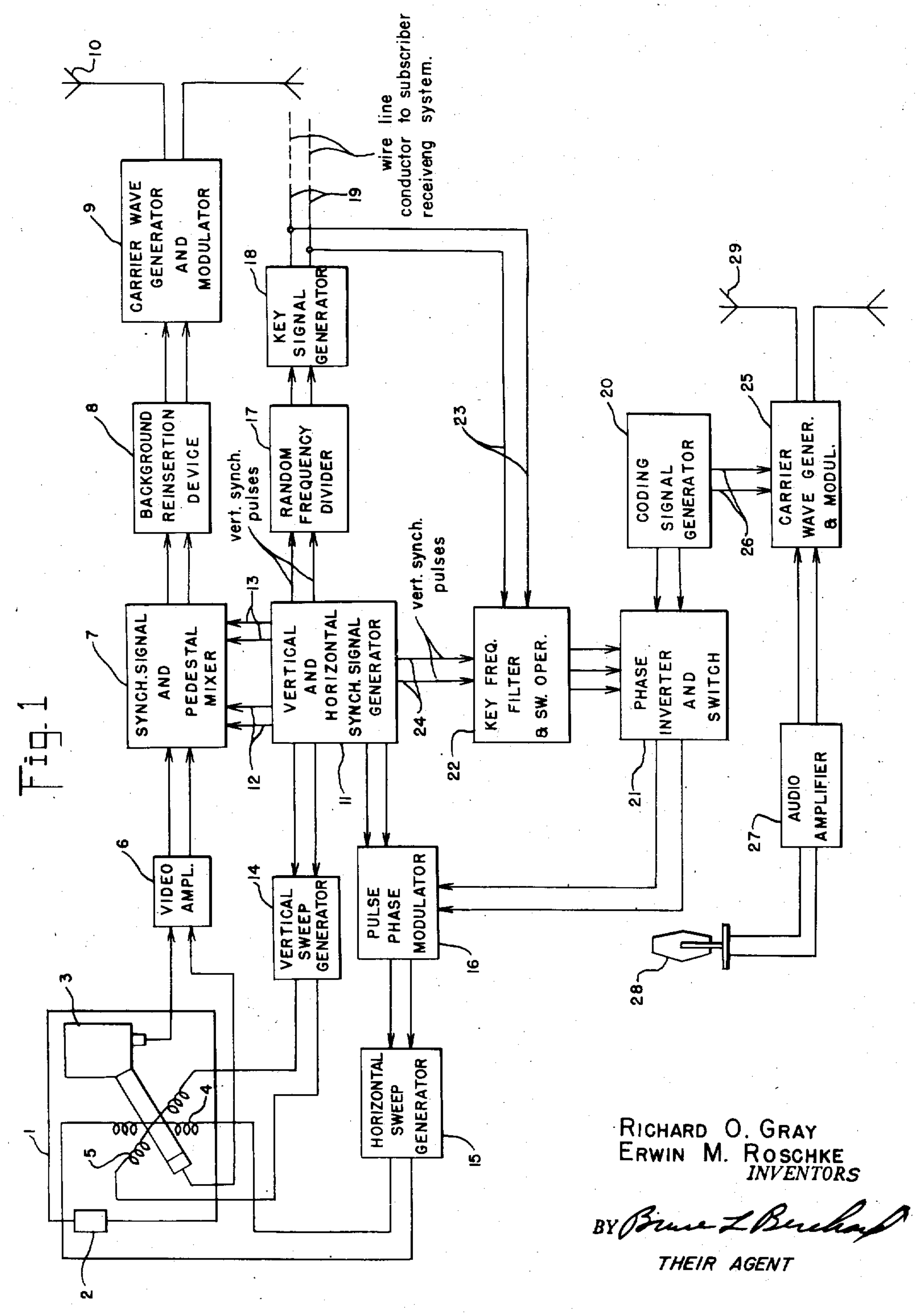
Figure 1 shows a television transmitter system incorporating the invention.
Figure 2:
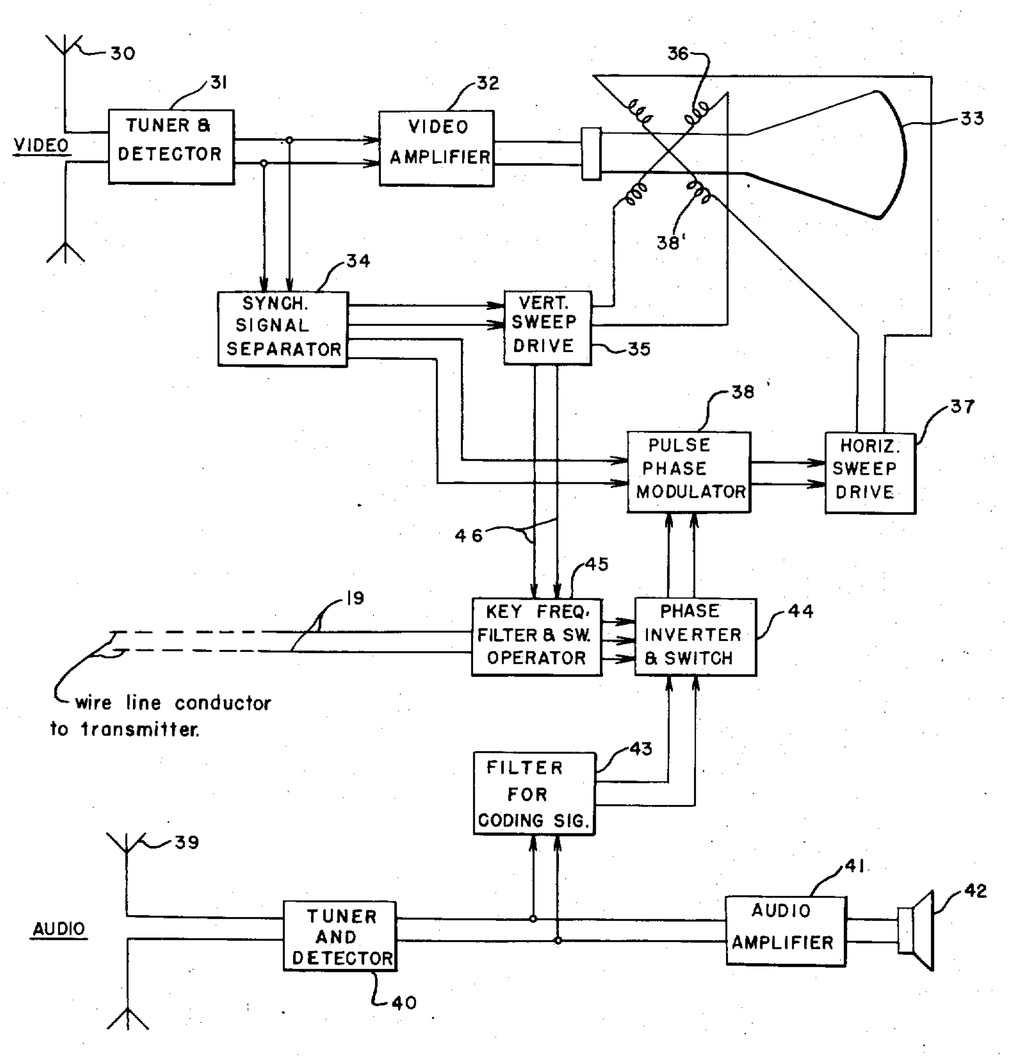
Figure 2 shows a receiver system operating in conjunction with the transmitter of Figure 1.

The various components that constitute the systems of Figure 1 and Figure 2 are in themselves either quite conventional, or have been previously described in copending application Serial No. 742,374, entitled "Radio Wire Signalling System," Ellett et al., filed April 18, 1947, or in copending application Serial No. 773,848, entitled "Image Transmission System," Roschke, filed September 13, 1947. Both these applications are assigned to the present assignee, and have now issued respectively as Patent 2,510,046 on May 30, 1950, and as Patent 2,547,598 on April 3, 1951. These components are therefore shown in block form, and a detailed description thereof is believed to be unnecessary.

Referring now to Figure 1, the television transmitter shown herein includes a usual camera 1. Camera 1 comprises a conventional lens system 2 for focusing images upon the screen of television pick-up tube 3, pick-up tube 3 being of the iconoscope or image orthicon type, and including a horizontal scanning coil 4 and vertical scanning coil 5. Video signals from tube 3 are amplified in video amplifier stages 6, and synchronizing signals and blanking pedestals are mixed with these video signals in synchronizing signal and pedestal mixer stage 7. Signals from stage 7 are impressed on background reinsertion device 8, and the resulting program signals, appropriately adjusted as to background level, are modulated on the video carrier in carrier wave generator and modulator stage 9, and thence radiated from antenna 10. Vertical and horizontal synchronizing signals are generated in vertical and horizontal synchronizing signal generators 11, and these signals are applied to stage 7 by way of leads 12 and 13 respectively. Vertical synchronizing signals from stage 11 are further impressed on vertical sweep generator 14, the output of which is coupled to the vertical scanning coil 5 of tube 3. Similarly, horizontal synchronizing signals from stage 11 are further impressed on horizontal sweep generator 15 through a conventional pulse phase modulator 16. Reference is made to page 473 of "Wave Forms," MIT Radiation Lab Series, volume 19, McGraw-Hill, 1949, for a detailed description of one type of pulse phase modulator suitable for inclusion in the present system. The modulator 16 is controlled, in a manner to be described, to alter the horizontal sweep of pick-up tube 3, the output of sweep generator 15 being applied to the horizontal sweep coil 4 of this tube. That is, assuming that a sine-wave signal is applied to modulator 16, the pulses applied to sweep generator 15 are time- or phase-modulated in accordance with this sine wave. This causes the timing of the horizontal sweep of tube 3 to vary in a continuous, cyclical fashion relative to the horizontal synchronizing signals developed by generator 11. Therefore, the timing of the video signals generated by tube 3 varies in similar fashion relative to the horizontal synchronizing signals applied to mixer 7 from generator 11. In this manner the aforementioned program signals are effectively coded since the video signal portion thereof does not have a fixed time relation with respect to the horizontal synchronizing signal portion, but has a timing that varies in accordance with the sine wave applied to pulse-phase modulator 16. Although modulator 16 is shown as being included in the horizontal sweep circuit, such a modulator may similarly be included in the vertical sweep circuit, as will become apparent as the present description proceeds.

Vertical synchronizing pulses from generator 11 are further impressed on random frequency divider 17, and random frequency divided pulses from divider 17 are utilized to trigger key signal generator 18, a burst of key signal being obtained on leads 19 in response to each of these random frequency divided pulses. The key signal generator may be of the type disclosed in aforementioned Patent 2,547,598 and described in detail therein in conjunction with Figure 12. Frequency divider 17 need not necessarily be of the random type, and may be any known frequency divider circuit. For example, the frequency divider may be of the type disclosed in aforementioned Patent 2,547,598 and fully discussed therein with reference to Figure 11. However, when it is desired that the frequency division of the pulses in divider 17 be of a random nature, the circuit of this divider may have a form similar to that disclosed in copending application Serial No. 32,457, entitled, "Random Frequency Divider," Erwin M. Roschke, filed June 11, 1948, issued March 11, 1952, as Patent 2,588,413, and assigned to the present assignee.

Leads 19 connect the transmitter with subscriber receiving systems, and these leads may conveniently be some form of wire line conductor such as power lines, phone lines, and the like, or these leads may be a coaxial cable, or when so desired, the key signals may be radiated on suitable carriers to the subscriber receivers. The frequency of the key signals is usually made such that is does not interfere with signals normally carried by the leads 19, however, the key signals may be transmitted to subscriber receivers in any suitable form such as pulses, or the like, the sole function of these key signals being to indicate to subscriber receivers the times when certain changes occur in the coding of the transmitted signal.

The pulse phase modulator 16 is controlled by coding signal generator 20, signals from generator 20 being impressed on this modulator through phase inverter and switch 21. Signal generator 20 may take the form of any well-known type of vacuum-tube oscillator, and unit 21 may be of the type disclosed in aforementioned Patent 2,510,046 and described in detail therein in conjunction with Figure 6. Phase inverter and switch 21 is utilized to change the characteristics of the coding signal impressed on modulator 16, which changes occur at various time intervals. In the illustrated embodiment, stage 21 acts to invert the phase of this coding signal in response to actuation of key frequency filter and switch operator 22. Stage 22 has previously been described in detail in aforementioned Patent 2,547,598 in conjunction with Figure 14 thereof. Bursts of key signal from leads 19 are impressed on stage 22 by way of leads 23, and in response to each burst of key signal, the next succeeding vertical synchronizing pulse on leads 24 connecting generator 11 to stage 22, acts to cause stage 21 to invert the phase of signals passing therethrough, and upon the termination of each burst of key signal, the next succeeding vertical synchronizing pulse on leads 24 acts to reverse this action.

Signals from generator 20 may take on any desired form such as pulses, saw tooth waves, sine waves, and the like and to add to the coding characteristics of these coding signals, they may be phase or frequency modulated by any suitable means, when so desired. The signals from generator 20 preferably are modulated on the audio carrier in carrier wave generator and modulator stage 25, this modulation being effected in any desired fashion, and these signals being impressed on stage 25 by way of leads 26. The audio signals accompanying the above described video signals are impressed on audio amplifier stage 27 from a usual microphone or translating device 28, the amplified audio signals are modulated on the audio carrier in stage 25 together with the coding signal, and the modulated audio carrier is radiated by antenna 29.

Hence, it can be seen that the transmitted television signal is coded by means of a coding signal from generator 20, which coding signal is transmitted on the audio carrier. It can further be seen that the coding signal as applied to modulator 16 is phase inverted from time to time, the times of such phase inversion being indicated to subscriber receiver systems by the key signals over private link 19, so that corrective circuits may be actuated thereby in these receivers. It is apparent that stage 21 need not necessarily be a phase inverter stage, as any suitable change may be imparted to the characteristics of the coding signal, so long as a similar corrective change is effected at the subscriber receiver at proper intervals.

Such a subscriber receiver is shown in Figure 2. Referring now to Figure 2, video signals are received on antenna 30, these signals being tuned and detected in tuner and detector stages 31. A detected video signal from stage 31 is amplified in video amplifier stage 32, and amplified signals from stage 32 are impressed on receiver image tube 33 in the usual manner. Synchronizing signals are removed from the detected signal by means of synchronizing signal separator stage 34, and vertical synchronizing signals derived from this stage are applied to vertical sweep drive 35 to actuate this drive, drive 35 in turn providing scanning potentials to vertical sweep coil 36 of tube 33. Horizontal synchronizing signals from separator 34 are applied to horizontal sweep drive 37 through pulse phase modulator 38, which modulator is similar to modulator 16 of Figure 1. The output of horizontal sweep drive 37 is impressed on horizontal sweep coil 38' of tube 33.

Audio signals accompanying the previously described video signals are received on antenna 39, and such signals are tuned and detected in tuner and detector stage 40. A tuned and detected signal is amplified in audio amplifier 41, and reproduced in signal translating device 42. The previously described coding signal is removed from the audio carrier by filter stage 43, and this coding signal is impressed on pulse modulator 38 through phase inverter and switch 44, this phase inverter and switch being similar to switch 21 of Figure 1.

In the absense of key signals on conductors 19, phase inverter and switch 44 passes the coding signal from filter 43 to modulator 38 in a non-inverted manner, and the horizontal sweep of the receiver image tube is changed to correct changes in the timing of the video signal components relative to the horizontal synchronizing signal components of the received television signal, and tube 33 therefore reproduces the received video signal. However, as previously stated the phase of the coding signal as applied to modulator 16 of the transmitter is inverted from time to time, such changes being indicated by the presence of key signals on conductors 19. Upon the receipt of such key signals, key frequency filter and switch operator 45, in response to the next succeeding vertical blanking pulse on leads 46 from vertical sweep drive 35, operates stage 44 to invert the phase of the received coding signal as applied to modulator 38 in correspondence to such inversion at the transmitter, so that tube 33 continues to reproduce the received video signal.

While a particular embodiment of the invention has been shown and described, modification may be made without departing therefrom. The appended claims are intended to cover any such modifications as fall within the true spirit and scope of the invention.

We claim:

1. A subscription receiver for utilizing electrical signals coded in accordance with a certain coding schedule determined by a characteristic of a coding signal for which said characteristic is altered during spaced time intervals, and for utilizing a decoding signal having a characteristic corresponding to said characteristic of said coding signal and received concurrently with said electrical signals, and for also utilizing a key signal designating said spaced time intervals and received over a line circuit, said receiver comprising: reproducing means; circuit means for supplying said electrical signals to said reproducing means; decoding apparatus included in said circuit means and responsive to an applied signal for decoding said electrical signals; a separating circuit coupled to said circuit means for selecting said decoding signal and for supplying said decoding signal to said decoding apparatus; and apparatus coupled to said line circuit and disposed between said separating circuit and said decoding apparatus and responsive to said key signal for altering during said spaced intervals said characteristic of said decoding signal as applied to said decoding apparatus to compensate for the alterations in said characteristic of said coding signal.

2. A subscription television receiver for utilizing a television signal and an audio signal at least one of which is coded in accordance with a certain coding schedule determined by a characteristic of a coding signal for which said characteristic is altered during spaced time intervals, and for utilizing a decoding signal having a characteristic corresponding to said characteristic of said coding signal and received concurrently with said television and audio signals, and for also utilizing a key signal designating said spaced time intervals and received over a line circuit, said receiver comprising: reproducing means; circuit means for supplying said television and audio signals to said reproducing means; decoding apparatus included in said circuit means and responsive to an applied signal for decoding said coded one of said television and audio signals; a filter circuit coupled to said circuit means for selecting said decoding signal and for supplying said decoding signal to said decoding apparatus; and apparatus coupled to said line circuit and disposed between said filter circuit and said decoding apparatus and responsive to said key signal for altering during said spaced intervals said characteristic of said decoding signal as applied to said decoding apparatus to compensate for the alterations in said characteristic of said coding signal.

3. A subscription television receiver for utilizing a television signal coded in accordance with a certain coding schedule determined by a characteristic of a coding signal for which said characteristic is altered during spaced time intervals, and for utilizing a decoding signal having a characteristic corresponding to said characteristic of said coding signal and received concurrently with said television signal, and for also utilizing a key signal designating said spaced time intervals and received over a line circuit, said receiver comprising: reproducing means; circuit means for supplying said television signal to said reproducing means; decoding apparatus included in said circuit means and responsive to an applied signal for decoding said television signal; a filter circuit coupled to said circuit means for selecting said decoding signal and for supplying said decoding signal to said decoding apparatus; and apparatus coupled to said line circuit and disposed between said filter circuit and said decoding apparatus and responsive to said key signal for altering during said spaced intervals said characteristic of said decoding signal as applied to said decoding apparatus to compensate for the alterations in said characteristic of said coding signal.

4. A subscription television receiver for utilizing a television signal coded in accordance with a certain coding schedule determined by a characteristic of a coding signal for which said characteristic is altered during spaced time intervals, and for utilizing an audio signal received concurrently with said television signal and modulated with a decoding signal having a characteristic corresponding to said characteristic of said coding signal, and for also utilizing a key signal designating said spaced time intervals and received over a line circuit, said receiver comprising: an image-reproducing device; apparatus for supplying said television signal to said reproducing device; a decoding circuit included in said apparatus and responsive to an applied signal for decoding said television signal; a sound-reproducing device; apparatus for supplying said audio signal to said sound-reproducing device; a filter circuit coupled to said audio-signal supplying apparatus for separating said decoding signal from said audio signal and for supplying said decoding signal to said decoding apparatus; and apparatus coupled to said line circuit and disposed between said filter circuit and said decoding circuit and responsive to said key signal for altering during said spaced intervals said characteristic of said decoding signal as applied to said decoding circuit to compensate for the alterations in said characteristic of said coding signal.

5. A subscription television receiver for utilizing a television signal including video-frequency components and synchronizing-signal components having their time relation with respect to one another varied in accordance with a certain coding schedule determined by a characteristic of a coding signal for which said characteristic is altered during spaced time intervals, and for utilizing an audio signal received concurrently with said television signal and modulated with a decoding signal having a characteristic corresponding to said characteristic of said coding signal, and for also utilizing a key signal designating said spaced time intervals and received over a line circuit, said receiver comprising: an image-reproducing device and an associated scanning system; apparatus for supplying said television signal to said reproducing device and said scanning system; a decoding circuit included in said scanning system and responsive to an applied signal for changing a timing characteristic of said scanning system to compensate for said variations in the relative timing of said video and synchronizing components; a sound-reproducing device; apparatus for supplying said audio signal to said sound-reproducing device; a filter circuit coupled to said audio-signal supplying apparatus for separating said decoding signal from said audio signal and for supplying said decoding signal to said decoding circuit; and apparatus coupled to said line circuit and disposed between said filter circuit and said decoding circuit and responsive to said key signal for altering during said spaced intervals said characteristic of said decoding signal as applied to said decoding circuit to compensate for the alterations in said characteristic of said coding signal.

6. A subscription television system comprising: a picture-converting device and an associated scanning system; a synchronizing-signal source coupled to said scanning system for supplying synchronizing pulses thereto to control the timing of said device; a pulse phase modulator disposed between said synchronizing-signal source and said scanning system; and a signal source coupled to said modulator for supplying a continuous wave signal thereto to vary the timing of said synchronizing pulses in accordance with the characteristics of said continuous wave signal.

7. A subscription television system comprising: a picture-converting device and an associated scanning system; a synchronizing-signal source coupled to said scanning system for developing synchronizing pulses to control the timing of said device; a pulse-phase modulator disposed between said synchronizing-signal source and said scanning system; and a signal source coupled to said modulator for supplying a sine-wave coding signal thereto to vary the timing of said synchronizing pulses in accordance with the characteristics of said sine-wave signal.

8. A subscription television system comprising: a picture-converting device and an associated scanning system; a synchronizing-signal source coupled to said scanning system for developing synchronizing pulses to control the timing of said device; a pulse-phase modulator disposed between said synchronizing-signal source and said scanning system; a signal source coupled to said modulator for supplying a continuous-wave signal thereto to vary the timing of said synchronizing pulses in accordance with the characteristics of said continuous-wave signal; and apparatus disposed between said signal source and said modulator for altering a characteristic of said continuous-wave signal at least during spaced intervals.

9. A subscription television system comprising: a picture-converting device and an associated scanning system; a synchronizing-signal source coupled to said scanning system for developing synchronizing pulses to control the timing of said device; a pulse-phase modulator disposed between said synchronizing-signal source and said scanning system; a signal source coupled to said modulator for supplying a continuous-wave signal thereto to vary the timing of said synchronizing pulses in accordance with the characteristics of said continuous-wave signal; and apparatus disposed between said signal source and said modulator for inverting the phase of said continuous-wave signal during spaced intervals.

10. A subscription television system comprising: a picture-converting device and an associated scanning system; a synchronizing-signal source coupled to said scanning system for developing synchronizing pulses to control the timing of said device; a pulse-phase modulator disposed between said synchronizing-signal source and said scanning system; a signal source coupled to said modulator for supplying a continuous-wave signal thereto to vary the timing of said synchronizing pulses in accordance with the characteristics of said continuous-wave signal; apparatus disposed between said signal source and said modulator responsive to an applied key signal for altering a characteristic of said continuous-wave signal; and a key-signal source coupled to said last-named apparatus for supplying said key signal to said apparatus during spaced intervals.

11. A subscription television system comprising: a picture-converting device and an associated scanning system; a synchronizing-signal source coupled to said scanning system for developing vertical and horizontal synchronizing pulses to control the timing of said device; a pulse-phase modulator disposed between said synchronizing-signal source and said scanning system; a signal source coupled to said modulator for supplying a sine-wave coding signal thereto to vary the timing of said horizontal synchronizing pulses in accordance with the characteristics of said sine-wave signal; a phase inverter disposed between said signal source and said modulator for inverting the phase of said coding signal in response to an applied signal; a circuit coupled to said synchronizing-signal source and to said phase inverter for applying a control signal to said phase inverter to actuate said phase inverter; and a key signal source coupled to said circuit for supplying a key signal thereto to condition said circuit during spaced intervals for actuation by said vertical synchronizing pulses.

12. A subscriber receiver for utilizing a television signal coded in accordance with a certain coding schedule comprising: an image-reproducing device; a circuit for receiving said television signal and for supplying said television signal to said reproducing device; decoding apparatus responsive to an applied signal for effectively decoding said television signal; means for deriving a first decoding signal representing a first coding schedule; means for deriving a second decoding signal representing a second coding schedule so related to said first coding schedule that operation of one of said decoding signals upon the other produces a third decoding signal representing said coding schedule of said television signal; apparatus coupled to said means to receive said first and second decoding signals and to produce said third decoding signal; and means for coupling said last-mentioned apparatus to said decoding apparatus effectively to decode said television signal.

13. A subscriber receiver for utilizing a television signal coded in accordance with a certain coding schedule comprising: an image-reproducing device; a circuit for receiving said television signal and for supplying said television signal to said reproducing device; decoding apparatus responsive to an applied signal for effectively decoding said television signal; means for deriving a first decoding signal representing a first coding schedule; means for deriving a second decoding signal representing a second coding schedule specifically different from but so related to said first coding schedule that operation of one of said decoding signals upon the other produces a third decoding signal representing said coding schedule of said television signal; apparatus coupled to said means to receive said first and second decoding signals and to produce said third decoding signal; and means for coupling said last-mentioned apparatus to said decoding apparatus effectively to decode said television signal.

14. A subscriber receiver for utilizing a coded television signal representing picture intelligence in a series of scanning fields recurring at a selected rate, said receiver comprising: an image-reproducing device; a circuit for supplying said television signal to said reproducing device; decoding means for effectively decoding said television signal; a control system for supplying an actuating signal to said decoding means to actuate said decoding means at a rate faster than the aforesaid selected recurrence rate of said scanning fields; and means coupled to said control system for varying said actuating signal and the actuation of said decoding means at a rate slower than said selected recurrence rate of said scanning fields.

15. A subscription television system comprising: means, including an image converter and an associated scanning system, for translating a television signal representing an image; a first encoding device coupled to said means for varying the operating mode thereof to effect encoding of said television signal; means for deriving a first encoding signal having a predetermined characteristic which varies in accordance with and represents a first coding schedule; a second encoding device coupled to said last-mentioned means to receive said first encoding signal and vary said characteristic thereof to derive a second encoding signal representing a second coding schedule; and means for supplying one of said encoding signals to said first-mentioned encoding device to actuate said device in accordance with the coding schedule represented by that signal.

16. A subscription television receiver for utilizing a coded television signal comprising: an image-reproducing device for producing the intelligence represented by said television signal; apparatus for receiving said television signal and for utilizing said signal to control said reproducing device; a first decoding device coupled to said apparatus and responsive to an applied actuating signal for varying the operating mode of said apparatus effectively to decode said television signal; means for deriving a first decoding signal having a predetermined characteristic which varies in accordance with and represents a first coding schedule; a second decoding device interposed between said last-mentioned means and said first decoding device and responsive to an applied actuating signal for altering said characteristic of said first coding signal to develop a decoding signal and for effecting actuation of said first decoding device; a signal source for deriving a second decoding signal representing a second coding schedule; and means for supplying said second decoding signal to said second decoding device to effect actuation thereof in accordance with said second coding schedule.

17. A subscription television receiver for utilizing a coded television signal, including video and audio components, and a concurrently received decoding signal having a predetermined characteristic which varies in accordance with and represents a first coding schedule, said receiver comprising: an image-reproducing device for reproducing the intelligence represented by said television signal; apparatus for receiving said television signal and for utilizing said signal to control said reproducing device; a first decoding device coupled to said apparatus and responsive to an applied actuating signal for varying the operating mode of said apparatus effectively to decode said television signal; means for separating said decoding signal from said television signal; a second decoding device interposed between said last-mentioned means and said first decoding device and responsive to an applied actuating signal for altering said characteristic of said decoding signal to develop a modified decoding signal for effecting actuation of said first decoding device; a signal source for deriving a second decoding signal representing a second coding schedule; and means for supplying said second decoding signal to said second decoding device to effect actuation thereof in accordance with said second coding schedule.

RICHARD O. GRAY.
ERWIN M. ROSCHKE.

References Cited in the file of this patent

UNITED STATES PATENTS

| Number | Name | Date |
|---|---|---|
| 1,522,359 | Clement | Jan. 6, 1925 |
| 1,706,379 | Clement | Mar. 19, 1929 |
| 1,754,876 | Clement | Apr. 15, 1930 |
| 1,790,486 | Roberts | Jan. 27, 1931 |
| 2,136,789 | Finch | Nov. 15, 1938 |
| 2,210,012 | Tainton | Aug. 6, 1940 |
| 2,242,633 | Toulon | May 20, 1941 |
| 2,251,525 | Rosenthal | Aug. 5, 1941 |
| 2,310,197 | Hansell | Feb. 2, 1943 |
| 2,402,058 | Loughren | June 11, 1946 |
| 2,402,067 | Mathes | June 11, 1946 |
| 2,403,059 | Dillenback | July 2, 1946 |
| 2,405,252 | Goldsmith | Aug. 6, 1946 |
| 2,405,500 | Guanella | Aug. 6, 1946 |
| 2,472,774 | Mayle | June 7, 1949 |
| 2,510,046 | Ellett et al. | May 30, 1950 |

FOREIGN PATENTS

| Number | Country | Date |
|---|---|---|
| 386,849 | Great Britain | Jan. 26, 1933 |